United States Patent
Fayette et al.

(10) Patent No.: US 11,682,175 B2
(45) Date of Patent: Jun. 20, 2023

(54) PREVISUALIZATION DEVICES AND SYSTEMS FOR THE FILM INDUSTRY

(71) Applicant: FD IP & LICENSING LLC, Los Angeles, CA (US)

(72) Inventors: Brandon Fayette, Los Angeles, CA (US); Gene Reddick, San Francisco, CA (US)

(73) Assignee: FD IP & LICENSING LLC, Los Angeles, CA (US)

( * ) Notice: Subject to any disclaimer, the term of this patent is extended or adjusted under 35 U.S.C. 154(b) by 0 days.

(21) Appl. No.: 17/410,479

(22) Filed: Aug. 24, 2021

(65) Prior Publication Data

US 2022/0058878 A1 Feb. 24, 2022

Related U.S. Application Data

(60) Provisional application No. 62/706,537, filed on Aug. 24, 2020.

(51) Int. Cl.
| | |
|---|---|
| *G06T 19/00* | (2011.01) |
| *G06T 13/40* | (2011.01) |
| *H04N 5/262* | (2006.01) |
| *G06T 13/80* | (2011.01) |
| *H04N 23/63* | (2023.01) |

(52) U.S. Cl.
CPC ............ *G06T 19/006* (2013.01); *G06T 13/40* (2013.01); *G06T 13/80* (2013.01); *H04N 5/2621* (2013.01); *H04N 23/633* (2023.01)

(58) Field of Classification Search
None
See application file for complete search history.

(56) References Cited

U.S. PATENT DOCUMENTS

| | | |
|---|---|---|
| 7,693,702 B1 | 4/2010 | Kerner et al. |
| 8,264,505 B2 | 9/2012 | Bathiche et al. |
| 8,743,145 B1 | 6/2014 | Price |
| 8,743,244 B2 | 6/2014 | Vartanian et al. |
| 8,896,629 B2 | 11/2014 | Meier et al. |
| 8,937,663 B2 | 1/2015 | Sugden |
| 8,943,420 B2 | 1/2015 | Goldthwaite et al. |
| 8,953,022 B2 | 2/2015 | McArdle et al. |
| 9,030,492 B2 | 5/2015 | Bischoff et al. |

(Continued)

OTHER PUBLICATIONS

International Search Report and Written Opinion dated Nov. 30, 2021 of PCT/US2021/047327, International Filing Date of Aug. 24, 2021, Applicant FD IP & Licensing LLC, Authorized Officer Kari Rodriquez, Forms PCT/ISA/220, PCT/ISA/210, and PCT/ISA/237, 16 pages.

*Primary Examiner* — Robert J Craddock
(74) *Attorney, Agent, or Firm* — Vorys, Sater, Seymour and Pease LLP; Mark A. Watkins

(57) ABSTRACT

The present disclosure relates to systems that capture a combination of image data and environmental data of the environment. The system uses the environmental data to create a detailed virtual scan of the environment. Computer generated models and images ("assets") are inserted into the detailed virtual environment from the scan. These assets are scaled and placed within the virtual environment at specific locations and having a specific orientation. The scaled and positioned asset is then composited with the real-time video signal allowing a user to view the asset in real-time on a display.

23 Claims, 4 Drawing Sheets

(56) References Cited

U.S. PATENT DOCUMENTS

| | | | |
|---|---|---|---|
| 9,070,216 B2 | 6/2015 | Golparvar-Fard et al. | |
| 9,122,321 B2 * | 9/2015 | Perez | G06F 21/00 |
| 9,164,577 B2 | 10/2015 | Tapley et al. | |
| 9,196,094 B2 | 11/2015 | Ur | |
| 9,215,293 B2 | 12/2015 | Miller | |
| 9,349,218 B2 | 5/2016 | Keating et al. | |
| 9,361,730 B2 | 6/2016 | Keating et al. | |
| 9,380,177 B1 | 6/2016 | Rao et al. | |
| 9,489,773 B2 | 11/2016 | Damola | |
| 9,495,760 B2 | 11/2016 | Swaminathan et al. | |
| 9,506,744 B2 | 11/2016 | Bridges | |
| 9,589,372 B1 | 3/2017 | Bean et al. | |
| 9,600,933 B2 | 3/2017 | Wu et al. | |
| 9,626,803 B2 | 4/2017 | Park et al. | |
| 9,665,983 B2 | 5/2017 | Spivack | |
| 9,717,981 B2 | 8/2017 | Robbins et al. | |
| 9,721,394 B2 | 8/2017 | Rosenthal et al. | |
| 9,728,007 B2 | 8/2017 | Hakkarainen | |
| 9,728,011 B2 | 8/2017 | Lam | |
| 9,741,170 B2 | 8/2017 | Park et al. | |
| 9,779,550 B2 | 10/2017 | Tobita | |
| 9,792,733 B2 | 10/2017 | Rosenthal et al. | |
| 9,846,972 B2 | 12/2017 | Montgomerie et al. | |
| 10,203,762 B2 | 2/2019 | Bradski et al. | |
| 10,388,070 B2 | 8/2019 | Spivak | |
| 10,594,786 B1 | 3/2020 | Perez, III et al. | |
| 2019/0066365 A1 | 2/2019 | Schmalstieg et al. | |

\* cited by examiner

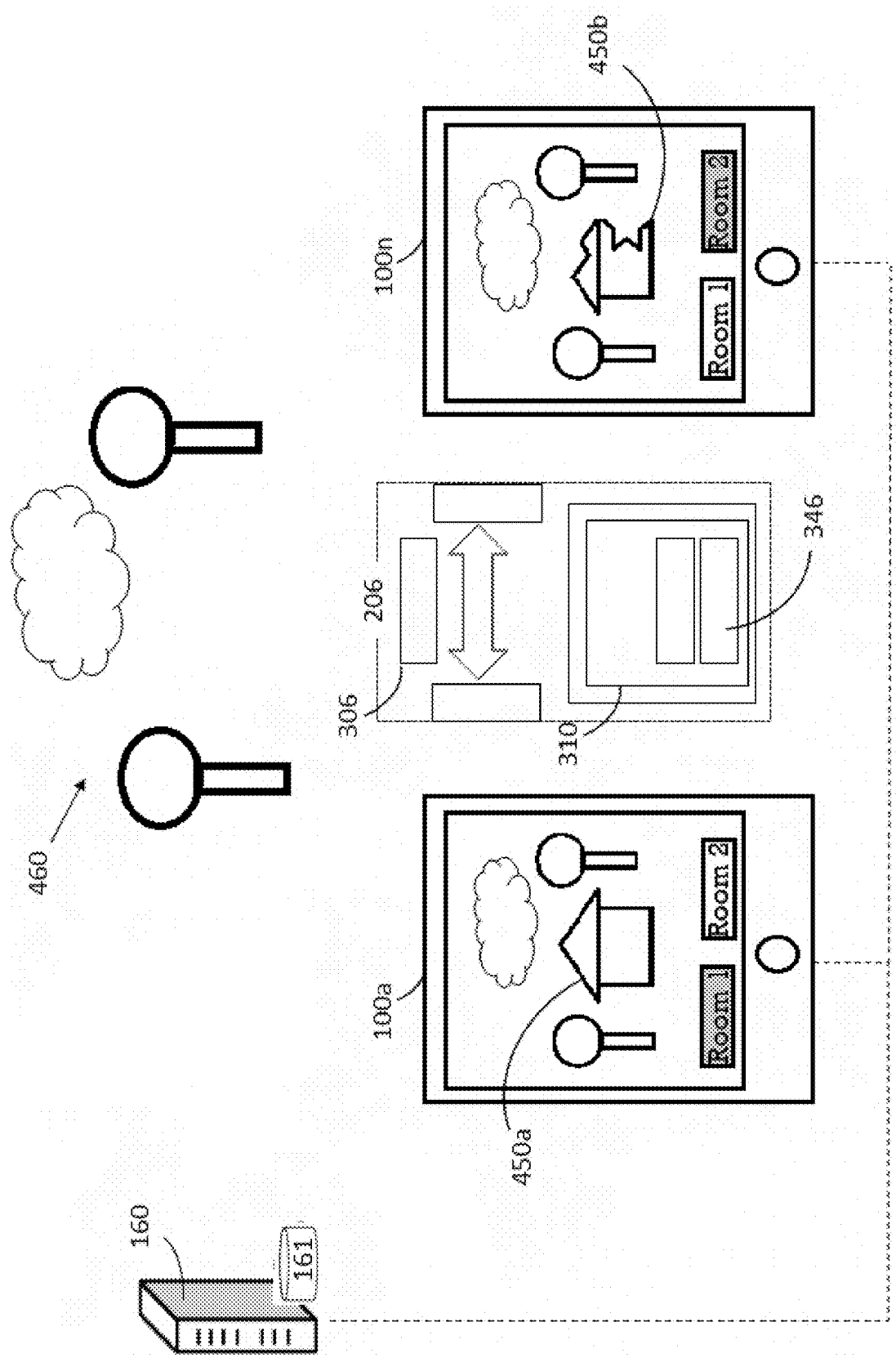

PREVISUALIZATION DEVICES AND SYSTEMS FOR THE FILM INDUSTRY

This application claims priority benefit of U.S. Provisional Patent Application Ser. No. 62/706,537 filed Aug. 24, 2020, entitled "PREVISUALIZATION DEVICES AND SYSTEMS FOR THE FILM INDUSTRY," the complete disclosure of which, in its entirety is herein incorporated by reference.

BACKGROUND

In film making, previsualization is the visualizing of complex scenes before they are recorded for a movie or show. Previsualization includes a variety of techniques for the planning and conceptualization of movie scenes that allows a director, cinematographer or video effects supervisor to experiment with different staging and art direction options—such as lighting, camera placement and movement, stage direction and editing, all without having to incur the costs of actual production.

TV shows and films mix a combination of live actors and real environments with computer-generated imagery (CGI). CGI elements include scenery, props, as well as moving graphics (vehicles, space ships and characters/creatures). Currently, in preparing for and filming these CGI enhanced scenes, a green screen technician is physically present within the set, holding a tall boom with a ball on the end to simulate the height of a particular CGI Asset that will later be added to the final film product using computer animation. Other environmental areas on set may be physically marked with tape to represent where a CGI Asset will be placed or travel. This makes preparation and filming difficult in that a significant amount of time is spent planning and positioning actors in desired locations in relation to hard to visualize CGI Assets.

SUMMARY OF DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

The present disclosure generally relates to a previsualization system that virtually maps a real film set environment and allows insertion of a scaled 3-dimensional CGI asset, e.g., digital vehicles, creatures, etc. in a previsualization video feed so that filmmakers can view all elements of a particular screen before filming. The previsualization system combines a real-time video signal with at least one CGI Asset and presents an augmented video signal to a video display component. Crew members of a filming project including directors, location scouters and actors are able to see the display and coordinate acting directions, body movements and the like considering the augmented video signal, making the filming process more efficient.

Embodiments disclosed herein include a method for generating a previsualization video signal for digital filming. The method includes with a video module, generating a raw video signal with an image sensor and with an environmental module, generating a 3D model of an environment from environmental data collected by an environmental sensor. The method further includes with an asset module, placing a CGI asset at a specific location within the 3D model of the environment and with a camera tracking module, tracking a position and an orientation of the image sensor based on data received from a motion sensor associated with the image sensor. The method also includes generating an augmented video signal, comprising the raw video signal with the placed CGI asset and displaying on at least one display, the augmented video signal. In a further embodiment, the environmental module is configured to receive a first set of environmental data from a first previsualization device, and a second set of environmental data from a second previsualization device, wherein each of the first previsualization device and second previsualization device are capturing environmental data at different perspectives of the environment. In another further embodiment, the method further includes with a depth occlusion module, occluding features of the raw video signal based on a determined depth of the features. In another further embodiment, the method further includes with a puppeteer module, receiving real-time motion capture data from a motion capture system for simultaneously animating the CGI asset in the augmented video signal. In another further embodiment the method includes transmitting the augmented video signal to at least one display. In another further embodiment the method includes recording the raw video signal to a storage device. In another further embodiment, the image sensor is a first image sensor of a first previsualization device generating a first raw video signal and a second image sensor of a second previsualization device generating a second raw video signal, wherein each of the first raw video signal and second raw video signal are augmented with the CGI asset based on generated environmental data and a calculated perspective of each associated device. In another further embodiment, the method includes storing the generated 3D model on a server.

Embodiments disclosed herein may further include a previsualization camera system that includes an image sensor configured to generate a raw video signal and a first environmental sensor configured to take environmental measurements of an environment and generate a 3D model of the environment. The system also includes a motion sensor configured to generate camera tracking data associated with movements of the previsualization camera system and a camera viewfinder configured to display a video signal to at least a camera operator. The system further includes a compositor configured to generate an augmented video signal comprising the raw video signal with a placed CGI asset positioned within the generated 3D model and position of the previsualization camera system wherein the augmented video signal is received by the camera viewfinder and displayed to the camera operator. In a further embodiment, the system includes a data storage medium configured to record the raw video signal. In another further embodiment, the data storage stores camera tracking data. In another further embodiment, the system includes a camera system interface configured to receive supplemental environmental measurements from a second previsualization device comprising a second environmental sensor in communication with the camera system interface, wherein the supplemental environmental measurements are used to increase a fidelity of the 3d model. In another further embodiment, the first environmental sensor is of a first type and the second environmental sensor is of a different second type, wherein the types of environmental sensors are selected from the group comprising an infrared system, light detection and ranging (LIDAR) systems, thermal imaging systems, ultrasound systems, stereoscopic systems, and optical systems.

Embodiments also disclosed herein may further include a previsualization system including a camera system including a digital processor, a camera image sensor in communication with the digital processor configured to generate a camera raw video signal, a camera environmental sensor in communication with the digital processor and configured to generate a first set of environmental measurements of an environment as well as a camera display in communication with the digital processor and configured to display a first augmented video signal. The previsualization system also includes a digital previsualization device in communication with the camera system and including a device environmental sensor configured to generate a second set of environmental measurements of the environment. The digital processor generates a 3D model of the environment based on the first and second set of environmental measurements and places a CGI Asset at a position and orientation within the 3D model. The camera display is configured to display a camera augmented video signal comprising the camera raw video signal and the placed CGI Asset. In a further embodiment, the system further includes a storage device configured to record the camera raw video signal. In another further embodiment, the system further includes a motion capture system configured to generate animation data, wherein the processor of the previsualization system animates the placed CGI Asset based on the generated animation data in real-time. In another further embodiment, the system further includes a remote monitor configured to display the camera augmented video signal. In another further embodiment, the previsualization device further includes a device processor, a device image sensor in communication with the processor and configured to generate a device raw video signal and, a device display configured to display a device augmented video signal, wherein the device processor generates a device 3D model of the environment based on the first and second set of environmental measurements and places a CGI Asset at a position and orientation within the 3D model and wherein the device display displays a device augmented video signal comprising the device raw video signal and the placed CGI Asset. In another further embodiment, the camera environmental sensor is of a first type and the device environmental sensor is of a different second type, wherein the types of environmental sensors are selected from the group comprising an infrared system, light detection and ranging (LIDAR) systems, thermal imaging systems, ultrasound systems, stereoscopic systems, RGB cameras, and optical systems. In another further embodiment, the system includes a server in communication with the camera system and previsualization device and is configured to receive the first and second set of environmental measurements and deliver each set of environmental measurements to each connected previsualization and camera system.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 4 illustrates an exemplary previsualization system with multiple devices viewing the same environment each having different states of an inserted CGI asset.

DETAILED DESCRIPTION

Figure 1:
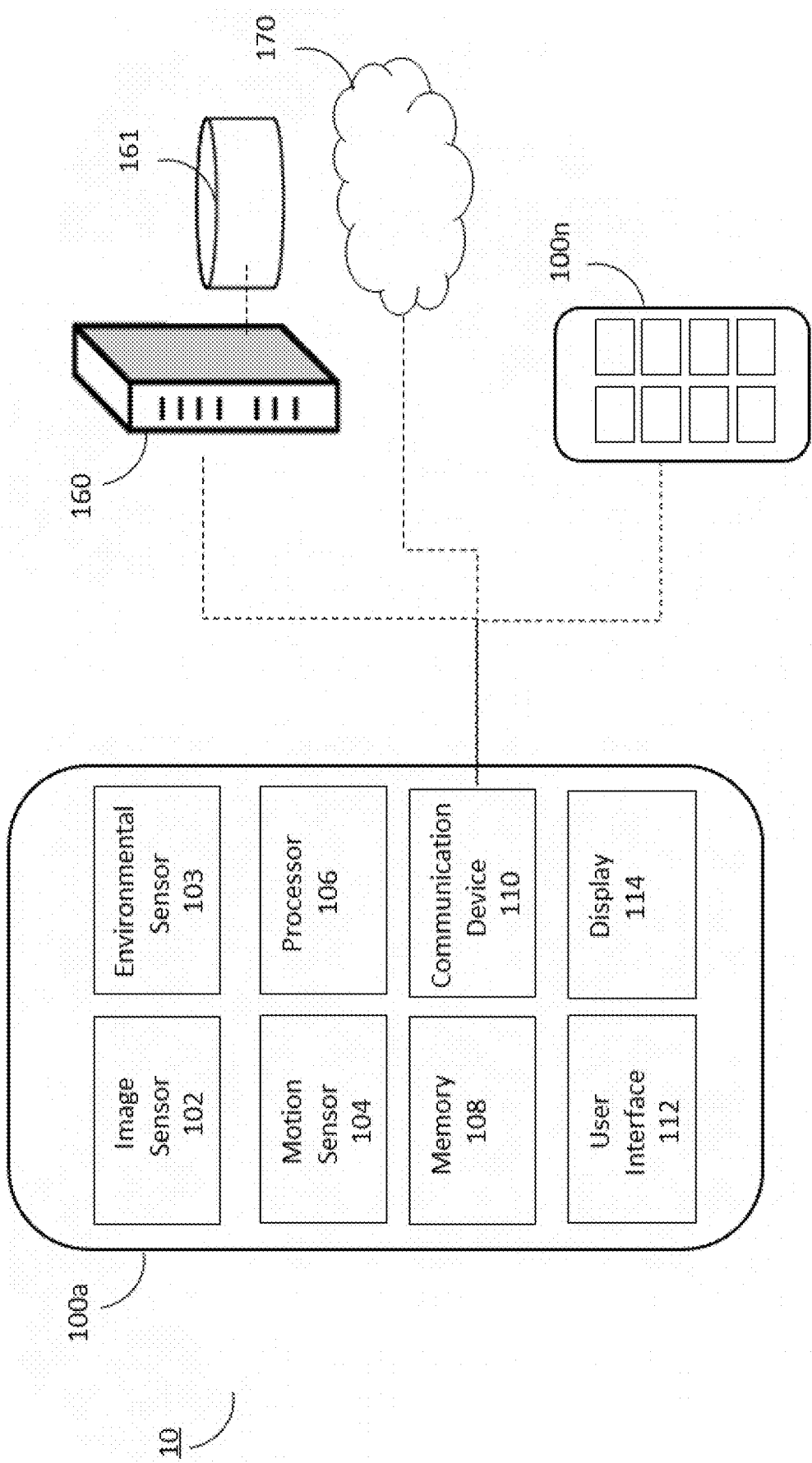
FIG. 1 illustrates an electronic device for previsualization of CGI assets in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms "generally" and "substantially" are intended to encompass structural or numeral modification which do not significantly affect the purpose of the element or number modified by such term.

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used herein, the term "CGI Asset" means a digital creation, rendering, or model of an object. CGI Assets include but are not limited to cars, space ships, monsters, creatures, machines, tables, statues, buildings, animals, weapons, and the like. CGI Assets may be created by a digital artist, graphic designer, and the like.

As used herein, the term "raw video signal," means a video signal that is obtained directly from the image sensor of a camera, e.g., capturing the on set environment and the actors working on the scene. As used here, the term "augmented video signal" means a video signal that includes a combination of the raw video signal and at least one CGI asset placed into the environment, e.g., a video signal including the environment, actors, and CGI assets.

Exemplary embodiments of the present disclosure relate to systems that capture a combination of image data from a video signal along with depth/environmental data of the film set environment. A system uses the depth/environmental data of the immediate film set environment and creates a detailed virtual scan of the same environment ("Virtual Environment"). Computer generated models and images, CGI Assets, are inserted into the detailed Virtual Environment. These CGI Assets are scaled and placed within the Virtual Environment at specific locations while having a specific orientation, and in some cases predetermined animations/movements. The scaled and positioned CGI Asset is then composited with the raw video signal, in real-time, allowing a user of the system to view the CGI Asset within the environment in real-time on a display. As the user moves in the real environment, the CGI Asset may appear to be stationary relative to the real environment or, in situations where the CGI asset is configured with predetermined animations, the CGI Asset may appear to move relative to the real environment, animating inside of that volume. The system can accommodate multiple image and depth capture devices, and combine all of the collected data to increase the fidelity of the virtual environment. Each image and depth/environmental capture device may view the same real world environment from different reference frames and see the CGI Asset from its particular viewpoint.

Referring now to FIG. 1, there is shown an exemplary embodiment of a previsualization system 10 including a digital previsualization device 100a configured for use in an environmental mapping and CGI Asset insertion visualization system. It will be appreciated that the various components depicted in FIG. 1 are for purposes of illustrating aspects of the exemplary embodiments and that other similar components, implemented via hardware, software, or a combination thereof, are capable of being substituted therein without departing from the scope of this disclosure.

The diagram of FIG. 1, illustrates an example digital previsualization device 100a including at least one image sensor 102 for capturing visual data, an environmental sensor 103 for capturing environmental data, at least one motion sensor 104 configured to detect an orientation of the digital previsualization device 100a, a processor 106, and a storage medium/memory 108.

The digital processor 106 is configured to control the operations and components of the digital previsualization device 100a and may execute applications, apps, and instructions that are stored in the device memory 108 and/or accessible via a communication device 110. The digital processor 106 can be variously embodied, such as by a single core processor, a dual core processor (or more generally by a multiple core processor), a digital processor and cooperating math coprocessor, a digital controller, a graphics processing unit (GPU) and the like. In some embodiments, the digital processor 104 and memory 108 may be combined within a single chip.

The at least one image sensor 102 may be, for example and without limitation, a charge-coupled device sensor (CCD) or complementary metal-oxide semiconductor sensor (CMOS) configured to capture visual data and generate a video feed (e.g., a series of images). In other words, the image sensor 102 may be a camera, either analog, digital, or a combination thereof. The image sensor 102 detects and conveys information used to make an image or video that may be stored in memory 108 or sent to another storage medium or device via an onboard communication device 110. For example, the image sensor 102 may generate a video signal that is sent to another device 100n via Wi-Fi.

The digital previsualization 100a also includes an environmental sensor 103. This sensor is configured to scan the immediate environment and determine the geometry and spatial configuration of the same. The environmental sensor 103 may operate by capturing depth points used by the system 10 for building the Virtual Environment, including a scaled virtual 3-dimensional model of the Environment. The environmental sensor 103 may be variously embodied as infrared systems, light detection and ranging (LIDAR) systems, thermal imaging systems, ultrasound systems, stereoscopic systems, RGB camera, optical systems or any device/sensor system currently known in the art, and combinations thereof, that are able to measure/capture depth and distance data of objects in an environment. For example and without limitation, the environmental sensor 103 may be an infrared emitter and sensor. Typical infrared emitters project a known pattern of infrared dots into the immediate environment. These infrared dots are not within the visible spectrum of the human eye and generally do not interfere with capturing a raw video signal. The infrared dots are then photographed by either an infrared sensor or image sensor 102 for analysis in determining the geometry and spatial configuration of the immediate environment. In other embodiments, the environmental sensor 103 may be a LIDAR based system. In LIDAR type systems, a pulsed laser is projected into the immediate environment, and the time it takes for the laser signal to return is used to generate a 3-dimensional model of the environment with great accuracy.

It is to be appreciated that any sensor system or combinations of sensor systems may be utilized as the environmental sensor 103 as each may have advantages based on the physical mechanism utilized for capture. For example, infrared systems may have difficultly capturing an outdoor environment in daylight as the immediate environment will be flooded with infrared light, making it difficult for the sensor to accurately capture the emitted pattern and accurately recreate a Virtual Environment of the geometrical and spatial configuration.

The motion sensor 104 may be a sensor or combination of sensors which are able to detect motions, orientations, accelerations and positioning of the previsualization device 100a, so that the position and orientation of the device 100a, relative to the environment (and Virtual Environment) may be determined. The motion sensor 104 may be variously embodied as a gravity sensor, accelerometer, gyroscope, magnetometer, and the like, or combinations thereof. For example and without limitation, the motion sensor 104 may be an inertial measurement unit (IMU) which is typically commercially available as a sensing unit including an accelerometer, gyroscope, and a magnetometer.

A gravity sensor is a motion sensor 104 that is configured to measure an orientation of the digital previsualization 100a with respect to the direction of gravity and create orientation data regarding the same. The gravity sensor enables the digital previsualization device 100a (via the processor 106) to recognize the direction of gravity relative to the device 100a based, for example, on calculated three-dimensional vectors. The gravity sensor may indicate an orientation, such as a degree of rotation with respect to the direction of gravity, of the digital previsualization device 100a.

An accelerometer is a motion sensor 104 configured to detect a change in velocity during a time period and senses an acceleration and create orientation data regarding the same. A three-axis accelerometer may include multiple motion sensors positioned in the x, y, and z-axis directions. The processor 106 of the digital previsualization device 100a receives from the accelerometer, data values measured in the multi-axis directions as vector values. The processor 106 may then determine a direction in which the digital previsualization device 100a is rotated or tilted based on values obtained with respect to the three axes.

A gyroscope is a motion sensor 110 configured to calculate an angle to which the device 100a rotates with respect to an axis and create orientation data regarding the same. This may be represented as a numerical value. A three-axis gyroscope calculates the degree to which the device 100a rotates with respect to three axes. Thus, at least one motion sensor, is able to generate information (data) about the position and orientation of the device 100*n* and create orientation data regarding the same with respect to the environment.

In some embodiments, the electronic device 100*a* is equipped with a communication device 110 configured to communicate with other digital previsualization devices 100*n* (equipped similarly to device 100*a*), a server 160, network cloud 170, storage devices, and the like. The communication device 110 may include wired communication components, wireless communication components, cellular communication components, near field communication components, Bluetooth® components, Wi-Fi components, and other communication components to provide communication via other modalities. This list of exemplary communication devices is intended to be exemplary and does not preclude the use of one or more of these components alternatively or in combination or preclude the use of still other communication components that perform substantially the same function in substantially the same way. The environmental data, orientation data, and image data may be transmitted to other connected devices via the communication device 110.

The digital previsualization device 100*a* may also include a user interface 112 configured to receive commands from a user of the device 100*a*. The user interface may include without limitation, a touchscreen device, a keyboard, a mouse, motion sensors, buttons, knobs, voice actuation, headset, hand recognition, gaze recognition, and the like. The user interface 112 may present the user with a graphical interface that may be facilitate operation of the device 100*a*, and other various components of the system 10, or components connected thereto.

The processor 106 is able to access the device memory 108, a storage 161 on a remote sever 160, a cloud based storage 170 containing a database of CGI Assets, or other on-board or remote storage device. As briefly described above, CGI Assets are digital creations, renderings, or models of an object and include a predetermined 3-dimensional shape and dimensional scale. CGI Assets may be defined and generated by a visual effects department/graphical designer and uploaded to the database of CGI Assets for use by the digital previsualization device 100*a* . . . *n*. In some embodiments, a CGI Asset includes "animation data", i.e., joint position, rotation, translation, scale, movements, key framing, wherein Key framing defines the starting and ending points of any smooth transitions of animation. The animation data may be complied into an CGI asset file or may be a separate data file associated with a particular CGI asset. CGI Assets may have multiple animation files associated therefore for different movements (movement of an asset in different directions, different speeds, and the like). As way of non-limiting examples, animation data may include, the flight path of a landing space ship, the flailing arm movements of a destructive monster, and the blowing movement of a tumbleweed. In some embodiments and described in greater detail below, the animation data associated with a CGI Asset may be manipulated/changed via the user interface 112, e.g., to speed up/slow down movements of the CGI Asset.

After 3D mapping the immediate environment, stored CGI Assets are able to be selected, positioned, and appropriately scaled within the 3-dimensional Virtual Environment by a user manipulating the user interface 112. A user viewing the display 114 of the device 100 sees both the real-time image of the immediate environment as captured by the image sensor 102 and the placed CGI Asset, that is scaled accordingly and of a particular orientation. A user of the device 100*a* may physically move around in the immediate environment while the environmental sensor 103 and motion sensor 104 continually capture environmental data and the relative motions of the device 100*a*, respectively. The digital previsualization 100*a* displays the placed CGI Asset within the captured video signal in its original position and orientation relative to the new real-time position of the device 100*a*. That is, the display 114 shows the CGI asset as if it were a real piece of the environment captured by the image sensor 102. As a non-limiting example, a user may capture the immediate environment of a football field while standing on the 10-yard line and placing the asset on the 50-yard line. The user may then move to the thirty yard line, yet still see the CGI Asset on the 50-yard line and also accounting for any lateral movements thereof.

In some embodiments and as briefly mentioned above, a CGI Asset may have associated animation data. Here, a starting location for an animated CGI Asset may be selected and the animation associated with the asset may be executed by the system 10. For example and without limitation, a user of the device 100 may select a starting and/or ending location in the Virtual Environment mapped to the immediate environment and the CGI Asset is configured to move from the starting location to an ending location based on predetermined animation data. In some embodiments, at least one device 100 includes an interface 112 configured to modify the animation data on the fly. A user may be able to adjust the entire animation or a portion/section of the animation. That is, a user be able to select or create a key frame within the animation data and adjust parameters of the animation data (e.g., speed) before or after the selected/created keyframe.

Additional digital previsualization devices 100*n* that may be equipped in a similar manner to the digital previsualization device 100*a* may connect to the previsualization device 100*a* directly or indirectly via a local server 160 or internet 170. It is to be appreciated that while one additional device 100*n* is illustrated, any number of devices 100*a* . . . *n* may be connected thereto without departing from the scope of this disclosure. These additional digital previsualization devices 100*n* sync with the environmental data collected and processed by the electronic device 100*a* and further supplement the environmental data generated by the first device 100*a* with additional measurements (data) generated by the additional devices 100*n*. The additional measurements by the additional devices 100*n* increase the fidelity of the 3-dimensional model of the environment, making the entire system 10 more accurate. The placed and orientated CGI Assets may be viewed on a display of the additional device 100*n* relative to the position and viewing angle of that particular additional device 100*n*. That is, each additional device 100*n* may have a different view of the environment and CGI asset than the digital previsualization device 100*a*, yet the CGI is viewed by each as if it were located in the same place in the real environment.

In accordance with another aspect of the present disclosure, a previsualization camera system is described. The previsualization camera system, like the previsualization system 10 described above has particular applications in the film industry in light of the industry's increased use of computer generated visual effects, including computer generated characters, vehicles, creatures, and environments. The previsualization camera system allows those working on a film project (movie, TV show episode, etc.), e.g., a director, to see not only what is captured by the cameras on set, but to see a CGI Asset integrated into the camera shot, while maintaining a clean video signal for recording purposes.

This allows for increased efficiency in filming and directing sequences as a comprehensive visualization of the sequence is able to be viewed in real-time providing immediate opportunities to adjust camera angles, positioning and the like.

The camera system also allows for a crew member to "location scout." That is, before filming, the crew member is able to layout a set, scene, action, or sequence virtually in order to previsualize the work to follow when official production starts on the scouted location. The camera system also makes allowances for distance based filmmaking in situations such as a pandemic or overseas filmmaking. Actors can be captured real-time in one location anywhere in the world and have their movements translated to a CGI Asset, like a virtual puppet, that can be driven in the 3D capture volume as seen by the camera in real time and directed by the voice of the director from across the world. The reverse is also possible in which the director could be off-site and the set, location, and actors could be virtually projected to the director while the real set, actors, and so forth are receiving instructions from around the world. Other aspects and advantages will become clear in the description below.

Figure 2:
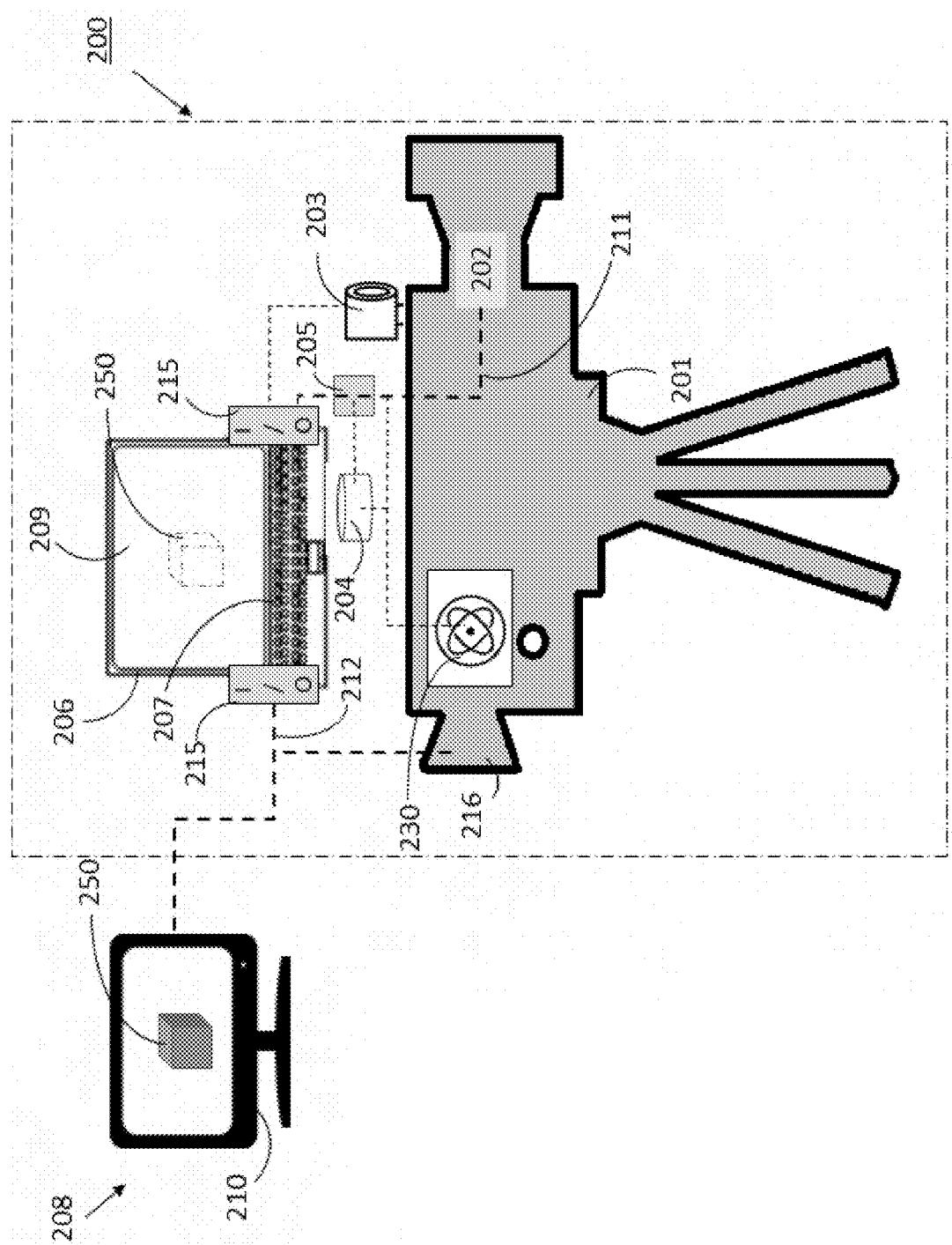
FIG. 2 illustrates an exemplary previsualization camera system in accordance with the present disclosure.

FIG. 2 illustrates an exemplary previsualization camera system 200 for use in the film industry, although the camera 201 may have applications other than film. Current state of the art systems include a digital movie camera 201 for digital cinematography that captures footage digitally by taking a rapid sequence of photographs on an internal image sensor (e.g., a CMOS sensor described above). This is different from historical movie cameras which shot on film stock. There are a number of digital video cameras on the market designed specifically for high-end digital cinematography use. These cameras typically offer relatively large sensors, selectable frame rates, recording options with low compression ratios or in some cases with no compression, and the ability to use high-quality optics. These are commercially available from vendors including but not limited to Sony, Red, and Canon and include the Sony CineAlta® series, RED ONE®, Panavision's Genesis® and others.

The sequence of images (a video) are typically recorded on a hard drive 204 or flash memory as an image and/or video file (e.g., .jpg, .mov, .mpeg, etc.). These files can be easily copied to another storage device, typically to a large Redundant Array of Inexpensive Disks ("RAID") connected to an editing system. An editing system may include a computer and/or additional equipment such as switchers, capture and playback devices, encoding devices, color correction devices and the like. Once data is copied from the on-set storage media (hard drive 204) to the storage array, the on-set storage media (hard-drive 204) is erased and returned to the set for more shooting.

Currently, digital cameras generate a raw video signal 211 which is recorded on a storage medium and displayed on both the viewfinder 216 of the camera 201 and to at least one monitor 210 in an on set video village 208. The viewfinder 216 of the digital camera 201 allows a camera operator to see, in real-time, exactly what the image sensor 202 of the camera 201 is capturing and recording. The raw video signal 211 generated by the image sensor of the camera 201 is also sent (via wired or wireless transmission) to a video village 208. A video village 208 is an area on a film set where at least one large monitor 210 is set up so that key film crew members can observe the video footage as it is being filmed. These crew members, including the director and director of photography, will watch the raw video signal in real-time and note (and correct) any potential problems.

As noted above, there are difficulties in filming a sequence/scene involving CGI Assets, as these CGI Assets are not physically present on the set and are added to the scene well after recording. Difficulties relate to directing an actor's line of sight (i.e., where should the actor look in relation to the CGI Asset) and positioning (i.e., where should an actor stand in relation to a CGI asset). The previsualization system 200 described herein addresses these and other issues.

In general, the previsualization camera system 200 is able to capture a video signal and associated environmental data and composite the raw video signal with a CGI Asset 250 of predetermined scale so that a filmmaker may "see" the CGI Asset within the scene and provide directions, accordingly. It is to be appreciated that in the exemplary embodiment, a CGI Asset 250 is illustrated as a cube. This is merely a simplification for illustration and the CGI Asset 250 may be of any shape and have associated movements and animations as described above. The previsualization camera system 200 includes a digital video camera 201 with at least one image sensor 202 configured to capture a sequence of images. The image sensor 202 of the digital video camera 201 is similar in some respects to image sensor 102, and best understood with respect thereto. The image sensor 202 of the digital camera 201 sends the sequence of images as a raw video signal 211 to a computer 206 via input/output interface 215. In some embodiments, the previsualization camera system 200 includes an image capture device 205 configured to intercept the raw video signal 211 output of the image sensor 202. The capture device 205 may be variously embodied such as a capture card hardware to get signal for manipulating. The capture device 205 may be internal to the computer system 206 or may be external hardware in communication with an interface 215 of the computer system. In some embodiments, the raw video signal 211 is sent both to the computer 206 via interface 215 and a storage medium 204 for recording and storage. In this way, the raw video signal 211 generated by the image sensor 202 of the camera 201 is recorded and stored for later processing, e.g., by a visual effects department during post production. As defined above, a raw video signal 211 means a video signal produced directly from the image sensor 202 of the camera 201 without the added CGI Assets as described below.

The computer 206 may be integrated within the digital camera 201 or positioned close to the camera 201, e.g., by custom mounting hardware, brackets, braces and the like. In this way, potential interference from Wi-Fi and other signals/frequencies commonly found on a film set are reduced. The computer 206 may be variously embodied without departing from the scope of the present disclosure, for example as a personal computer (illustrated), tablet, smartphone or other known device that hosts a software platform, operating system, and/or applications. The computer system 206 may also be configured to interface with any known camera system 201 and perform the compositing of raw video signals, environmental data, and CGI Assets to create an augmented video feed 212. That is, the computer system 206 may have plug and play capabilities to connect to and receive digital signals from any camera and/or sensors.

The computer system 206 includes a processor that may be any of various commercially available processors and may be similar in some respects to the processor 106 of FIG. 1, and therefore may be best understood with reference thereto. The computer 206 also includes at least one user interface 207 and/or display 209 configured to present data related captured by the previsualization camera system 200, including displaying the CGI Asset 250, environmental data, and/or the video signal from the image sensor 202. The user interface 207 also allows a user to input commands into the computer 206 for monitoring and controlling the various components of the previsualization system 200. In the exemplary embodiment the user interface 207 is a keyboard, however it is to be appreciated that other user interfaces may be substituted herein, e.g., touch screen interfaces, a computer mouse, and the like. The computer 206 may also host an operating system including but not limited to Windows®, Linux®, Apple®, Android® or an in-house created operating system. In some embodiments, the computer includes a graphical processing unit (GPU) configured to process video signals generated by at least the image sensor 202.

The previsualization camera system 200 also includes at least one environmental sensor 203 mounted to either the digital camera 201 or ancillary components/mounting brackets, hardware, and the like. The environmental sensor 203 is configured to capture the geometry and spatial configuration of the immediate environment, e.g., creating depth points, and may be similar in some respects to the environmental sensor 103 of FIG. 1, and therefore may be best understood with reference thereto. The environmental data captured by the environmental sensor 203 is sent to the computer 206, e.g., via interface 215, for processing. The computer 206 uses the environmental data continuously and/or periodically generated by the environmental sensor 203 to create a 3-dimensional model/mesh of the immediate environment ("Virtual Environment"). As will be explained in greater detail below, the computer 206 is able to access a database of CGI Assets 250 (vehicles, characters, creatures, props, scenery, and the like), wherein each CGI Asset is dimensionally defined, and insert the CGI Asset 250 into the generated virtual environment such that a user of the system viewing a monitor 210 may view the CGI Asset placed in the film since captured by the image sensor 202.

The digital camera 201 is generally configured to receive a variety of different and interchangeable optical lenses. In filmmaking, camera lenses have a significant impact on the look of the images and the recording the visual story that a filmmaker is trying to establish. Lenses include but are not limited to wide-angle lenses, fisheye lenses, and zoom lenses. Two fundamental parameters of an optical lens are the focal length and maximum aperture. The lens' focal length determines the magnification of the image projected onto the image plane, and the aperture the light intensity of that image. For a given photographic system the focal length determines the angle of view, short focal lengths giving a wider field of view than longer focal length lenses. A wider aperture, identified by a smaller f-number, allows using a faster shutter speed for the same exposure. A side effect of using lenses of different focal lengths is the different distances from which subjects can be framed, resulting in a different perspective. Given the different perspectives that relate to different lenses, calibration of the environmental sensor 203 to the particular optical lens in use on the camera 201 may be needed. Calibration to the focal length, aperture, zoom field of view, lens type and/or camera film back are calculated to ensure that the CGI asset is properly scaled and positioned within the augmented video signal. Calibration may include modifying the parallax as the imagery, as changing a lens modifies the parallax, e.g., a wide angle lens may make buildings on the peripheral look curved.

In some embodiments, a companion application/module is configured to run on the computer system 203 which includes a database of optical lenses and preset calibration values (focal length, zoom, aperture, lens type, camera film back, camera focal plane, camera sensor size). When an optical lens on the camera 201 is changed, a user of the companion application may select the new optical lens which calibrates the camera system 200 such that the data from the environmental sensor 203 and raw video signal 211 from the camera 201 include a substantially similar scale. This allows for proper placement and viewing of an inserted CGI Asset 250 as the captured environmental data will proportionally comport with the captured image data. Also factoring into the calibration calculation is the size of the image sensor 202 of the digital video camera 201, as different cameras may have differently sized image sensors that may contribute to a larger or smaller field of view.

The previsualization camera system 200 also includes a motion sensor 230 mounted to the camera 201 such that the position, orientation, and movements of the camera 201 may be monitored, tracked, and stored. In this way, the previsualization camera system 200, with reference to an origin, can calculate a position and orientation of the camera 201 in relation to the generated 3-dimensional model of the environment. All camera movements (transforms) are tracked and stored so that the position of the camera with respect to what was filmed (and captured environmentally) is known. This aids the visual effects artists for adding the final high-resolution CGI Assets into the raw video signal to create the film product as there is little to no guessing on how to line up effects, visually. So for example at a specific frame in the video signal, the CGI Asset 250 position and rotation is known as the camera 201 position and rotation is known in relation to the mapped Virtual Environment. As the camera transform positions and rotations are captured and tracked by timestamp, but may not match up exactly to the timestamp of the current camera frame, the exact position of the virtual camera, and thus the relative position of the CGI assets, can be interpolated between the closest recorded camera transform captures. Thus the camera image, the camera position and rotation, the virtual camera displaying the image on the compositor, and all the CGI Assets are synchronized to an accurate position.

In some embodiments, the previsualization camera system 200 also includes input/output interface 215 configured to send data collected by the camera 201 and various sensors (e.g., sensor 203) and/or send a video signal augmented with a positioned CGI Asset (Augmented Video Signal 212). For example, the computer 206 combines the raw video signal 211 from the image sensor 202 of the camera 201 with the 3-dimensional model of the environment constructed from the environmental data to augment a CGI Asset into an Augmented Video Signal 212. This Augmented Video Signal 212 may be sent to the viewfinder 216 of the camera, such that the camera operator sees the CGI Asset while filming with the camera 201. Simultaneously, the Augmented Video Signal 212 may be sent to a monitor 210 of the video village 208 for crew members to see, in real-time, the view of the camera 201 including the CGI Asset 250.

In some embodiments, the Augmented Video Signal 212 is recorded to a storage medium, such as storage medium 204. During filming, a raw video signal 211 (without the low resolution CGI asset) and an augmented video signal 212 (with the low resolution CGI asset) of the same sequence/scene is captured. In the same way that the previsualization system 200 allows the director to best direct the actors in reacting to CGI Assets 250 that are not really there, the augmented video signal 212 provides guidance to the visual effects department that processes the raw video signal 211 and adds the high definition visual effects. That is, sometimes there are difficulties experienced by post production visual effects artists in determining the best positioning of high resolution CGI Assets. Having the augmented video signal 212, which previously aided the actors in positioning and reacting to the CGI Asset, facilitates the process of placing the final visual effects in the raw video signal to create a final product.

Figure 3:
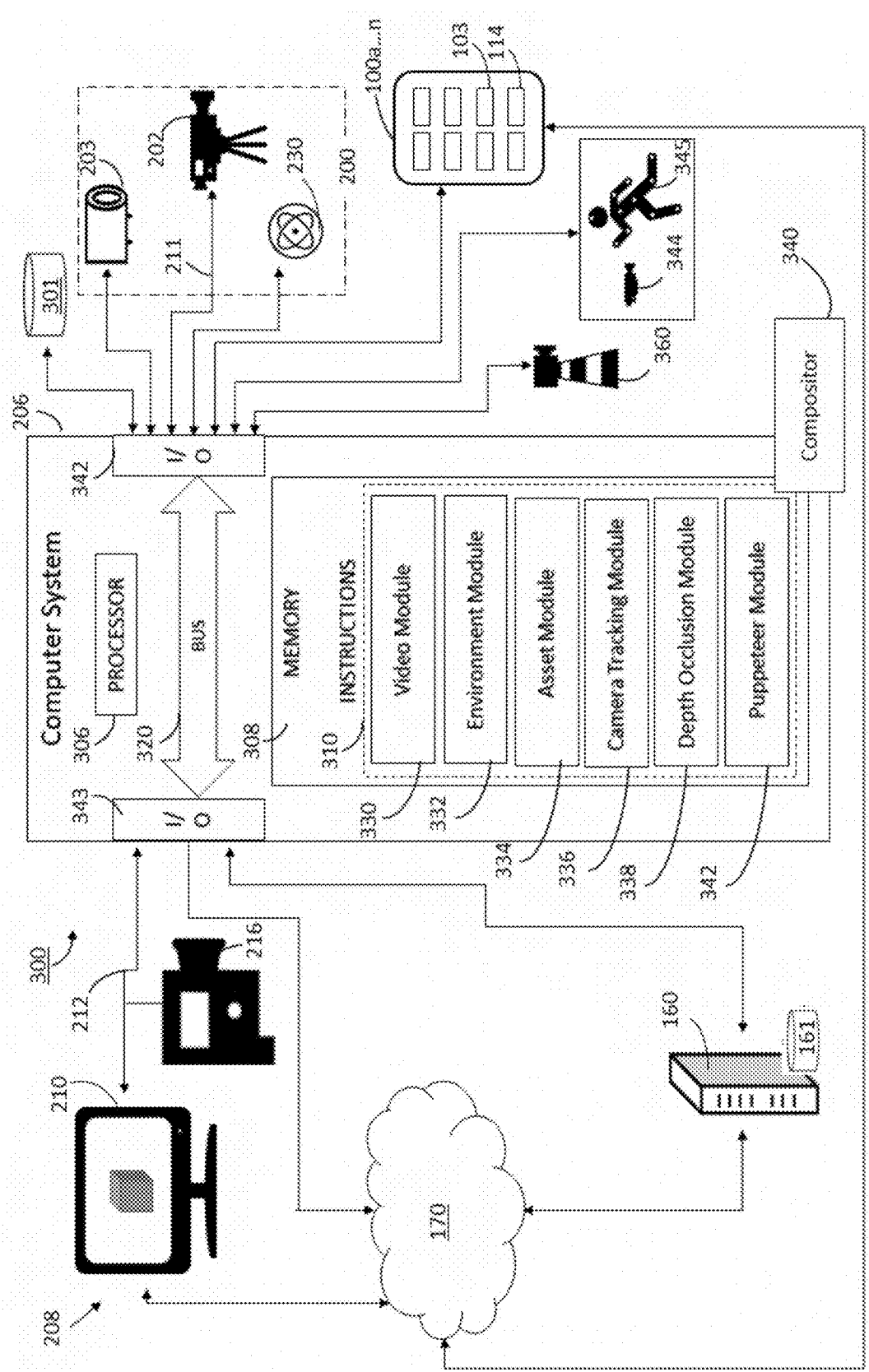
FIG. 3 illustrates an exemplary previsualization system in accordance with the present disclosure.

In accordance with another aspect of the present disclosure and with reference to FIG. 3, an exemplary previsualization system 300 for the film industry is provided. While the present disclosure describes the previsualization system with respect to filming movies and TV shows, it is to be appreciated that the present disclosure is amenable to other like applications. It will be further appreciated that the various components depicted in FIG. 3 are for purposes of illustrating aspects of the exemplary embodiment, and that other similar components, implemented via hardware, software, or a combination thereof, are capable of being substituted therein. The system 300 is configured to combine a raw video signal generated by a digital camera 201 with a CGI asset placed in a 3-dimensional model of the filmed environment.

As shown in FIG. 3, the system 300 includes a central system represented generally as the computer system 206, which is capable of implementing the exemplary method described below. As described above, the computer system 206 may be variously embodied without delineating from the scope of the present disclosure. The exemplary computer system 206 includes a processor 306, which performs the exemplary method by execution of processing instructions 310 that are stored in memory 308 connected to the processor 306, as well as controlling the overall operation of the computer system 206. In some embodiments, the processor 306 and memory 308 may be combined in a single chip.

The various components of the computer system 206 may all be connected by a data/control bus 320. The processor 306 of the computer system 206 may be in communication with an associated data storage 301, digital video camera 201/image sensor 202, environmental sensors 203, motion sensors 230 and other digital previsualization devices 100a . . . n via a communications link 342. The processor may also be in communication with other components including a server 160, a cloud network 170, a video village 208, and a viewfinder display 216 via link 343. While each component is illustrated as connecting to the computer via one of the two illustrated links 342, 343, it is to be appreciated that the number of links 342, 343 is not limiting and that any component may connect to the processor any communication link. A suitable communications link 342, 343 may include, for example, a proprietary communications network, infrared, optical, or other suitable wired or wireless data communications.

The instructions 310 include a video module 330 configured to receive and process a raw video signal (e.g., raw video signal 211) from the image sensor 202 digital video camera 201. The raw video signal 211 is an electronic recreation of moving visual images in the form of encoded digital data. The raw video signal may be characterized by the number of pixels supported horizontally, e.g., 1080P, also known as HD, 2K and BT.709. In prior art digital video cameras, the raw video signal 211 is passed directly to the viewfinder 216 allowing the camera operator to see the raw video signal 211. In some embodiments, the raw video signal 211 from the image sensor 202 is split, wherein the raw video signal is sent both to the computer 206 where it is received and processed by the video module 230, and to a storage medium, such as storage medium 204 or 301.

In some embodiments, the video module 330 is configured to change the video coding format of the raw video signal 211. That is, the coding format of the raw video signal 211 received from the image sensor 202 of the camera 201 is changed by video module 330, and the newly formatted raw video signal is sent to the displays of the viewfinder 216 or video village 208. Examples of video coding format include but are not limited to H.262 (MPEG-2 Part 2), MPEG-4 Part 2, H.264 (MPEG-4 Part 10), HEVC (H.265), Theora, RealVideo RV40 VP9, and AV1. In other embodiments, the video module 330 is configured to change the video coding of the video signal.

In yet still other embodiments, the video module 330 is configured to change the compression of the raw video signal 211. That is, the raw video signal 211 may be compressed to make the video file size smaller than its original format. In embodiments wherein the video module 330 compresses the raw video signal 211, the processing of the compressed raw video signal by the processor 306 and other devices/modules may be faster compared to the uncompressed raw video signal 211. The video module 330 may also optimize performance characteristics of the raw video signal 211, for example and without limitation the number of frames per second (FPS), video quality, and resolution. The optimization allows the raw video signal to be processed in a more efficient and faster manner, making the operation of the system 200 smoother.

The instructions 310 also include an environmental module 332 configured to receive environmental data from one or more environmental sensors 203 mounted to the camera 201, or otherwise provided as a reference thereto, as illustrated with respect to FIG. 2. The environmental module 332 uses the environmental data obtained by the environmental sensors 230 and determines the geometry and spatial configuration of the immediate environment by locating geometrical objects and/or points and determining a distance between those objects and/or points. The environmental module 332 uses the environmental data continuously generated by the environmental sensors 203 to create a 3-dimensional model/mesh of the environment (Virtual Environment). In some embodiments, the environmental module/ environmental sensor, periodically (rather than continuously) generates and updates the environmental data and Virtual Environment. In some embodiments, the environmental module 332 uses photogrammetry algorithms to generate the Virtual Environment of the immediate environment using one or a combination of the video signals generated by the camera and environmental data generated by the environmental sensor. For example, multiple photographs from one or both of the image sensor and data sensor may be stitched together to build a 3-dimensional model of the immediate environment. In other embodiments, point data, e.g., a point cloud, generated from the points observed in the real environment (either object features or infrared point illumination) is converted to a mesh (polygon or triangle mesh) model representing the real immediate environment.

In some embodiments, the environmental module 330 is configured to change the level of detail (LOD) of the generated 3D model, including but not limited to geometry detail and pixel complexity within the Virtual Environment. Generally, in computer graphics, accounting for the LOD may include decreasing the complexity of the 3D model representation. LOD techniques increase the efficiency of the 3D rendering by decreasing the workload on the graphics processing.

In some embodiments, the environmental module 332 is configured to receive environmental data from other devices in communication with the previsualization system 300. For example, the environmental module 332 may receive environmental data from the environmental sensor 203 attached to the camera 201 and from additional digital previsualization devices, such as digital previsualization devices 100a . . . n, described in greater detail above with respect to FIG. 1 and each including an environmental sensor 103. In some embodiments, the environmental module 332 is configured to receive environmental data from a server 160 and/or cloud network 170 provided to the server and cloud by connected devices, 100a . . . n, 203.

The instructions 310 also include an asset module 334 configured to retrieve CGI Assets (e.g., CGI Assets 250) and insert selected CGI Assets into the 3-dimensional modeled environment (Virtual Environment) generated by the environmental module 332. The CGI Assets 250 may be stored in a database on the storage device 301 or accessible to the asset module 334 via cloud storage or removable storage 161 in communication with server 160. The CGI Assets 250 within the database are defined as having a 3-dimensional shape and dimension. For example and without limitation, a CGI Asset may be CGI dragon model, having a 3-Dimensional body and predetermined dimensional scale, i.e., the dragon may be configured to have a size of about 50 meters in length. In this way, the CGI dragon would appear much larger than a typical human filmed standing next to the creature. In some embodiments, CGI assets may be uploaded directly or remotely (via the cloud 170 or remote server 160) as desired and immediately accessible to the asset module 334. Animation data may also be incorporated into the CGI Asset file and/or a CGI Asset 250 may be associated with one or more animation files, including sequences of movement, keyframes, e.g., animation joint position, rotation, translation, scale. Vertex world position and scale are stored. Texture UV UDIM tile data are stored, timestamp is stored, frame time is stored, animation curve data and keyframes. For example, if a director on set would like to have a new CGI Asset 250 enter the scene, the director could have the visual effects team upload the desired CGI Asset 250 to the system 300 via the cloud 170. The director then has the ability to immediately place the new CGI Asset within the scene and adjust the filming and direction of the actors accordingly. This also works for sets, environments, and set extensions. In some embodiments, the asset module 334 is configured to change the level of detail (LOD) of the CGI Asset 250, including but not limited to geometry detail and pixel complexity within the Asset. LOD techniques increase the efficiency of the 3D rendering by decreasing the workload on the graphics processing. In some embodiments, a user may modify the animation data associated with the CGI asset, e.g., to speed up or slow down all of or portions of the predetermined movements.

The instructions 310 also include a camera tracking module 336 configured to determine the position of the camera 201 with respect to the 3-dimensional model generated by the environmental module 332. The camera tracking module 336 receives real time spatial tracking data of the camera from the motion sensors 230 positioned on the camera 201 or camera rig. In this way, as the camera operator moves the camera 201 to capture different angles of the environment and scene, the calculated movement of the camera 201 by the camera tracking module 332 is accounted for in the display of the CGI asset in the augmented video signal. In other words, the tracking of the camera 201 ensures that while the environment and perspective of the camera is changing, the placed CGI Asset 250 remains in its selected position, although viewed in respect to the changed camera perspective. In some embodiments, the camera tracking module 336 triangulates the position of each device, camera 201 and previsualization devices 100a-n based on visual matching to the real time 3-dimensional scan from all devices (camera 201, previsualization devices 100a-n).

In some embodiments, a lighthouse device 360 is configured to track the position of the camera 201 and each previsualization device 100a-n. The lighthouse device 360 may be variously embodied. In some embodiments the lighthouse device 360 includes at least one camera or environmental sensor that detects the presence and position of a user or device within the set. The at least one camera (image sensor) or environmental sensor may be similar to the image sensor 201 and environmental sensor 203 and best described with reference thereto. The lighthouse device 360 may be positioned off set such that the camera crew and/or their devices 100 may be within the view of a camera on the lighthouse device 360. The lighthouse device 360 sends the positioning data related to each user and/or device captured to the camera tracking module 336 for processing the position of each device. In some embodiments, the lighthouse device 360 includes a unique marker, such as a QR code, physical prop or object ("spatial anchor") that each device (camera 201 and previsualization devices 100a-n) is able to view with its respective image sensor. In these embodiments, the camera tracking module 336 triangulates the position of each device, camera 201 and previsualization devices 100a-n based on video signals from multiple devices in real time using a spatial anchor. In some embodiments, the spatial anchor may be a virtual anchor. Without a lighthouse device 360 or similar system, each device 100a-n would have its own view of where CGI Assets are placed, and any change or positioning made on one device would not necessarily be reflected in the same way on any other devices 100a-n. A lighthouse device 360 provides a shared view of the position and rotation of the objects that in some embodiments, underpins the entire system.

In some embodiments, the camera movements calculated by the camera tracking module 336 are recorded in a storage medium, such as the storage medium 161. After the raw video signal of a scene is recorded, the raw video signal and camera movements may be given to the special effects department for finalizing the scene, e.g., adding hi-resolution CGI assets to the raw video signal. Having the coordinates of the camera 201 as it is filming the sequence is generally helpful to the visual effects team in finalizing the shot in terms of knowing perspectives, angles, etc. of things in captured in the scene. The positioning data may be recorded as an FBX file or 3-dimensional asset file as described above.

The instructions 310 also include a depth occlusion module 338 that is able to determine whether objects on set should be placed in front of or behind a CGI Asset. Conventional Augmented Reality systems have trouble deciphering depth of objects in relation to CGI Assets. For example, if an actor walks into the area of the set being filmed, the actor is typically placed over the CGI Asset 250 in the composite image as a default. This makes directing the actors and filming more difficult as the composite image does not show the desired depth of the actor/CGI Asset relationship. Conventional methods to solve depth occlusion issues involve the use of a body recognition module. These modules are provided information of an actor and a CGI graphic. It can calculate where a person is, and where the CGI asset is and place the person or CGI asset accordingly. While this approach works for a single device, this does not function well with multiple devices. In the present situation, a compositor 340 generates the augmented video signal based on the data provided from each module. That is, the compositor receives the raw video signal from the camera feed and CGI Assets and does the occlusion here. While each device may have native occlusion function in relation to its own camera feed or system, the ability to process the data in real time is extremely processor intensive and involves a lot of data. While this may be sufficient for a single device, the data processing for a system without a native occlusion function, e.g., a compositor or computer, becomes difficult.

In some embodiments, the depth occlusion module 338 is configured to calculate a depth for pixels in the raw video signal 211 and remove those pixels that are calculated as being behind the positioned CGI Asset 250. This enables the CGI asset to be fully interactive having the ability to occlude and/or be occluded by objects and actors in the real scene. The image sensor 202 of the digital camera 201 may capture an actor walking at a distance across the field of view of the digital camera 201. A CGI asset digitally placed in the forefront of virtual environment is able to hide the walking actor as he or she walks "behind" the CGI Asset. If the image sensor 202 of the digital camera 201 captures an actor walking at a distance that is in front of the placed CGI asset, the walker occludes at least part of the CGI asset during that portion of the walking path. Without the depth occlusion module 338, the CGI asset will simply overlay the video images and always appear in the forefront.

In some embodiments, the depth occlusion module 338 is in communication with the environment sensor 203 and/or the digital 3-dimensional model of the environment and receives signals generated therefrom. The depth occlusion module 338 may render the 3-dimensional model as a transparent mask that hides virtual objects. Occlusion is generally difficult because typical Augmented Reality systems do not have the ability to perceive its environment precisely or quickly enough for realistic occlusion. However, in the present previsualization system 300, depth occlusion is facilitated by having multiple devices providing environmental data to the system 300, e.g., device 100a with environmental sensor 103 supplements the environmental data provided by environmental sensor 203 most likely at a different perspective of the same environment.

In some embodiments, depth occlusion module 338, is configured to generate a digital avatar of a person (avatar data) in view of a device, e.g., device 100a. That is, the current position of a person (actor) is tracked and a human avatar is created that tracks the actor's movement at the joint level. The limited avatar data is then able to be propagated to the other devices 100n, and the compositor 340 for creating the augmented video signal. The avatar data may be associated with an occlusion mesh i.e., instructions for the compositor 340 to cut a hole in the video feed that is the shape of the avatar. That is, an occlusion mesh can clear (remove) any pixels with a depth further from the camera than the object. In other words, a corresponding avatar, created from the avatar data is generated on the compositor 340 with an occlusion mesh. The position of the occlusion avatar matches that of the actual actor, but the occlusion mesh cuts out any CGI Assets that are located behind it. The occlusion avatar thus becomes just another CGI object on the compositor having associated depth and position data, In this way, portions of images in the raw video signal 211 are displayed where avatar data instructs a hole to be present. In other words, the hole of the avatar data, is filled with the raw video feed signal 211 that is behind the avatar.

In some embodiments, the immediate environment is scanned and a spatial map of primarily static objects (walls, floors, furniture) is generated. Prior to filming the spatial map is saved as an FBx file and imported to the composition 340. An occlusion mesh may be applied to objects in the spatial map and any pixels within a depth further from the camera than the object may be removed. Since the occlusion mesh on an object (an avatar being tracked to an actor in the scene, or on a cube representing a wall) removes all pixels behind it, when a device renders something with an occlusion mesh it cuts out all the pixels where the avatar or wall would have been, leaving just empty (black) pixels in the rendered image from that device. When the final image gets composited the compositor effectively cuts out any CGI Assets that would be behind the object in the camera image.

As a way of further example, an actor being tracked on a first device and the position of that actor may be pushed to an avatar with an occlusion mesh through the Compositor. When the actor is behind a CGI Asset, the Asset will appear in front of the cinema camera image and obscure the actor and the occlusion mesh will do nothing. If the actor is in front of the CGI Asset, the occlusion mesh will cut out the pixels of the CGI Asset and reveal the actor in the cinema camera image as if the person was in front of the asset.

In some embodiments, the depth occlusion module 338 may have sub-modules to facilitate processing of the depth occlusion feature. Each sub-module may associate with certain properties (field of view, focal point, etc.) that allows it to create an image that would be the same (or similar) to what a physical camera would capture (raw video feed). A first occlusion sub-module may receive the raw video feed from a physical camera and ignore any CGI Asset. A second sub-module would include the CGI objects but not the camera feed. The images of the first and second sub-module are then composited with any effects including but not limited to occlusion, motion blur, color correction, etc.). The final rendered image may be sent to a third sub-module whose output may be sent to a display. In yet some further embodiments, the sub-modules may be embodied as virtual camera that generate images. In yet even further embodiments, each sub-module is embodied as a hardware component to the system.

In some embodiments, the system 300 includes a puppeteer module 342 configured to use real-time motion capture having low latency to animate the inserted CGI Asset 250. That is, a human actor 345 (whom may be offset) is recorded by a motion capture system 344 and the information acquired from recording the human actor is used to animate a digital character model in two or three dimensional computer animation. Generally, the movements of the actor 345 are captured with disregard to the visual appearance of the actor 345, this actor animation data is mapped and/or transformed to the 3-dimensional CGI Asset model or a skeleton associated with the CGI Asset 250 so that the CGI Asset 250 performs the actions of the actor 345. For example, if it is desired for the CGI Asset 250 to walk from one point to another on set, the actor 345 whom may or may not be in view of the main recording camera 201 may perform the walking action that is captured by the motion capture system 344. The puppeteer module 342 uses the walking movement captured from the actor 345 and animates the CGI Asset 250 in the augmented video signal 212. In some embodiments, the motion capture system 344 is configured to puppet the face of an actor 345 such that the face of the actor portraying a non-human character is modified by the puppeteer module 342 in real-time so that the director on set may appropriately direct the actor 345 and others on set.

In some embodiments, the puppeteer module 342 may supply the movements of a puppeteer which are distributed to the asset module 334 for animation. That is, the movements of the puppeteer are modeled to a skeleton of an asset which coordinates the movements of the 3D CGI Asset 250. In turn, the Asset module 334 may modify the LOD of the asset and provide different CGI assets that may be applied to the same skeleton model. For example, in instances where processing power is limited, a lower LOD CGI Asset may be associated with the skeleton model. In instances where processing power of the system is adequate, a higher LOD CGI Asset may be associated with the skeleton model of the puppeteer module 342, providing a higher quality, more detailed asset within the augmented video signal. In other words, the system may be able to swap out CGI Assets of varying resolutions based on the processing hardware making the video processing more efficient as processing power decreases or increasing the detail of the video signal as processing power increases.

The video module 330, environmental module 332, asset module 334, camera tracking module 336, and depth occlusion module 338 work together to generate a real-time augmented video signal (a previsualization image) 212 that is provided to the viewfinder 216 of the camera and at least one monitor 210 of at least one video village 208. That is, the augmented video signal 212 includes the raw video signal (or portions thereof, if occlusion is desired) with the CGI Asset 250 with certain objects or the CGI Asset itself occluded based on a calculated depth of objects in the real environment. In this way, the crew members on set see a rough estimate of what the final scene would look like after special effects are added to the recorded raw video footage.

In some embodiments, the system 300 includes a compositor 340 configured to communicate with each of the modules 330-338 and generate the augmented video signal 212 based on the data provided from each module 330-342. The compositor 340 may be variously embodied as either a module within the instructions 310 and/or a piece of hardware in communication with the computer system 206. In some embodiments, the compositor 340 is in communication with multiple camera systems 200 and/or digital previsualization devices 100a . . . n.

The previsualization system 300 allows for the use of multiple devices, e.g., camera system 200, and digital previsualization devices 100a . . . n, each device contributing environmental data (and increasing the fidelity) of the 3-dimensional model of the environment. In some embodiments, each device 200, 100a-n, generates its own 3-dimensional model from environmental data captured by the device. In other embodiments, each device 200, 100a-n, generates its own 3-dimensional model (Virtual Environment) from environmental data captured by all connected devices. Each of these 3D models may be stored on each associated device or on a local server and sent to other devices connected to system 300 as desired. In yet still other embodiments, each device of the system 300 may access a shared 3-dimensional model existing on a server 160 or within the cloud 170.

For example, each device accesses a 3d model and a placed CGI asset such that a first device, e.g., the camera system 200, may view the scene and display a first augmented video signal containing a CGI asset from a first perspective and a second device, e.g., a digital previsualization device 100a, may view the scene and display a second augmented video signal containing the CGI asset from a second perspective. Each device/system may exchange data and share processing with one another directly, or through the use of a computer, e.g., computer system 206, a server 160, local area network (LAN), wide area network (WAN) and/or cloud 170.

With multiple systems and devices 200 and 100a . . . n having its own unique augmented video signal 212, crew members on set performing different tasks are able to view the scene with their specific goals in mind. For example and without limitation, the camera system 200 may capture the particular scene and send the augmented video signal to both the viewfinder 216 and video village 208. Simultaneously, a crew member directing crowds within the same scene and located at a different location on the set may use a portable digital previsualization device 100 to view a different view of the scene with an augmented video signal tailored to the perspective of the portable digital previsualization device 100. In this way, the crew member can direct people around the CGI Asset 250 as if it were visible in front of them so that the crowds can move in a believable fashion.

Furthermore, the multiple device system 300 allows for any device or subsystem 200, 100 to change the position and orientation of the CGI Asset within the scene. For example, the camera operator or director using the camera system 200 may first roughly place the CGI Asset 250 to a desired position. Another crew member, e.g., the director of photography, using another device, such as digital previsualization device 100, may move the CGI asset to a more precise location while viewing the scene and asset from a different viewpoint. The change of the location of the CGI asset within the virtual 3-dimensional environment is then propagated by the system 300 to other devices and subsystems connected to the system 300. In some embodiments, an administrator of the system 300 may set certain permissions for devices connected to the system 300, e.g., allowing some users of devices 100 to modify the CGI Asset and denying other users.

In other embodiments, each subsystem/device (200, 100a . . . n, respectively) may choose to receive the augmented video stream of another device. For example, a user of a remote digital previsualization device 100a may choose to view the augmented video signal 211 as captured by the camera system 200. This allows the crew member using the device 100a to access varying perspectives of the scene with the CGI Asset and direct those people in the scene accordingly for filming.

In some embodiments and with reference to FIG. 4, the instructions 310 include a room module 346. The room module 346 is configured to display different states of the same CGI asset 450a, 450b with respect to the same real environment 460. That is, each digital previsualization device 110a, 100n, is scanning the same real environment 460 and adding environmental data to a 3-dimensional model of that environment (increasing the fidelity of the 3D model). The digital previsualization device 100a illustrates a first room relating to the environment 460 having a first state of the CGI asset 450a, in this case a CGI building 450a is viewed between two trees. The digital previsualization device 100n illustrates a second room relating to the environment 460 having a second state of the CGI asset 450b, in this case a CGI building that is partially destroyed 450b is viewed between two trees. The room module 346 may have particular application for location scouting for filmmakers, although it is to be appreciated that other applications may exist and that the location scouting application is presented without limitation to illustrate the features of the system 300 and room module 346. For example, a particular environment 460 (location) may be chosen for a set of a film. The plot of the film may have a particular building be present within the environment with an intact version of the building 450a in the beginning of the film and a destroyed version of the building 450b later in the film. The system 300 may be set up on a local server 160 to which digital previsualization devices 100a, 100n, may connect. Each of the digital previsualization devices 100a,n simultaneously and continuously scan the local environment 460 and provide data for the creation of a 3D model (Virtual Environment) by the environmental module 332. A first crew scouting the location and setup for an earlier scene involving the intact building 450a may use the digital previsualization device 100a and analyze the location and potential position of actors in a first virtual room, room 1. A second crew may simultaneously scout the same location and setup for a later scene involving the destroyed building 450b and may use the previsualization device 100b to analyze the location and potential position of actors in a second virtual room, room 2. In other words, the room module 346 allows multiple sets of people to look at different versions of the same space in the real world. This allows the crew members to plan ahead, having multiple teams on set setting marks, and using multiple states of the same asset 450. In other embodiments, rooms are configured to use different CGI assets, rather than different states of the same CGI asset.

In some embodiments, the data processing and storage is performed within the cloud 170. A local application in communication with the cloud 170 may be configured to track the movement of all the devices and subsystems of the previsualization system, such as the exemplary previsualization system 300. The data collected by the local application may be pushed to server 160 that shares the data to all connected devices in real time. In this way, if a particular device 100a has permissions to move a CGI Asset 250, movement of the CGI Asset 250 within that device, propagates the movement of the CGI Asset 250 to all of the devices in connection with device 100a.

In some embodiments, a previsualization system, such as the exemplary previsualization system 300, is configured to hold a Virtual Environment indefinitely. For example, the Virtual Environment, i.e., the 3-dimensional model generated by the combination of devices collecting environmental data, may be held on a server 160 on location, a computer system such as the exemplary computer system 206, a storage of a previsualization device 100, or on a server of a cloud 170. In this way, if one device, e.g., digital previsualization device 100, were to crash, the generated 3-dimensional model is not lost. Furthermore, once the crashed device 100 is back online and begins scanning the environment, the software hosted on the device 100 is configured to recognize its position in relation to the real and virtual model and reinsert the CGI asset as if the device had never crashed. The indefinite storage of the 3-dimensional model allows for easy transition between multiple days' work. For example, when with a particular outdoor environment on one day and having an associated 3-dimensional model of the outdoor environment, if it becomes impracticable to continue working on the outdoor environment (e.g., it rains), the environmental data and CGI asset positioning may be held, until it is practical to return to working in the outdoor environment.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

The term "software," as used herein, is intended to encompass any collection or set of instructions executable by a computer or other digital system so as to configure the computer or other digital system to perform the task that is the intent of the software. The term "software" as used herein is intended to encompass such instructions stored in a storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A method for generating a video signal during a previsualization of a scene comprising:
receiving, by a video module, a raw video signal comprising one or more images representative of an environment captured by an image sensor;
generating, by an environmental module, a virtual environment model of the environment based on environmental data characterizing the environment and captured by at least one environmental sensor;
inserting, by an asset module, a computer-generated imagery (CGI) asset at a given location in the virtual environment model;
determining, by a camera tracking module, a position and an orientation of the image sensor with respect to the virtual environment based on motion sensor data provided by a motion sensor;
generating an augmented video signal comprising the raw video signal with the CGI asset based on the given location of the CGI asset in the virtual environment and the determined position and orientation of the image sensor with respect to the virtual environment.

2. The method according to claim 1, wherein the environmental sensor is a first environmental sensor, the environmental module is configured to receive a first set of environmental data corresponding to the environmental data from a first previsualization device having the first environmental sensor, and a second set of environmental data from a second previsualization device having a second environmental sensor characterizing the environment, wherein each of the first previsualization device and second previsualization device capture the environment at different perspectives.

3. The method according to claim 1, further comprising occluding, by a depth occlusion module, one or more features of the raw video signal by the CGI asset based on a determined depth of the one or more features.

4. The method according to claim 3, wherein the occluding comprises:
   determining, by the depth occlusion module, a depth for pixels in the raw video signal based on the environmental data and/or the virtual environment model;
   identifying, by the depth occlusion module, a subset of the pixels in the raw video signal corresponding to a portion of the one or more features that is behind the CGI asset based on a determined depth for the subset of pixels; and
   removing the subset of pixels in the raw video signal corresponding to the portion of the one or more features that is behind the CGI asset.

5. The method according to claim 1, further comprising receiving, by a puppeteer module, motion capture data characterizing a human motion captured by motion capture system, the CGI asset being animated in the augmented video signal based on the motion capture data.

6. The method according to claim 1, further comprising causing the augmented video signal to be displayed on at least one display.

7. The method according to claim 1, occluding, by a depth occlusion module, at least partially the CGI asset with one or more features of the raw video signal based on a determined depth of the one or more features.

8. The method according to claim 7, wherein the occluding comprises:
   determining, by the depth occlusion module, a depth for pixels in the raw video signal based on the environmental data and/or the virtual environment model;
   identifying, by the depth occlusion module, a subset of the pixels in the raw video signal corresponding to a portion of the one or more features that is in front of the CGI asset based on a determined depth for the subset of pixels; and
   removing, by the depth occlusion module, a portion of the CGI asset that is behind the one or more features in response to identifying the portion of the one or more features that is in front of the CGI asset.

9. The method according to claim 1, wherein the environment comprises a person, and the method further comprises:
   generating, by a depth occlusion module, an avatar representative of the person; and
   outputting, by the depth occlusion module, avatar data characterizing the avatar.

10. The method according to claim 9, wherein the augmented video signal is a first augmented video signal, the raw video signal is a first raw video signal of the environment from a first perspective, the method further comprising generating a second augmented video signal comprising a second raw video signal of the environment from a second perspective with the CGI asset and the avatar, the avatar being generated based on the avatar data.

11. The method according to claim 10, wherein generating the second augmented video signal comprises removing pixels from the second raw video signal of the environment that is in a shape of the avatar based on the avatar data and inserting the avatar at a location of the removed pixels from the second raw video signal.

12. The method according to claim 1, further comprising:
   intercepting the raw video signal being provided by the image sensor;
   storing the raw video signal in a storage medium as raw video signal data in response to intercepting the raw video signal; and
   providing the raw video signal to the video module in response to intercepting the raw video signal.

13. The method according to claim 12, wherein a capture device is used to store the raw video signal at the storage medium and provide the raw video signal to the video module.

14. The method according to claim 1, causing the augmented video signal to be provided to a viewfinder of a camera at a first location during a filming of the environment, and to be provided to at least one display at a second location during a filming of environment.

15. A previsualization camera system for use in generating a video signal during a previsualization of a scene comprising:
   a camera configured to output a raw video signal comprising one or more images of an environment corresponding to the scene;
   an environmental sensor configured to output environmental data characterizing the scene;
   an environmental module configured to generate a three-dimensional (3D) model of the scene based on the environmental data, and insert a computer-generated imagery (CGI) asset at a given location in the 3D model;
   a motion sensor configured to generate camera tracking data characterizing movements of the camera; and
   a compositor configured to generate an augmented video signal comprising the raw video signal with the CGI asset based on the given location of the CGI asset in the 3D model and the camera tracking data, wherein the augmented video signal is received by a camera viewfinder of the camera.

16. The previsualization camera system according to claim 15, wherein the environmental sensor is a first environment sensor of a first previsualization device, and the previsualization camera system further comprises a camera system interface configured to receive additional environment data characterizing the scene from a second environmental sensor of a second previsualization device, the environmental module configured to generate the 3D model of the scene further based on the additional environmental data.

17. The previsualization camera system according to claim 16, wherein the first environmental sensor is of a first type and the second environmental sensor is of a second type different from the first type, wherein the first and second environmental sensors is one of an infrared system, a light detection and ranging (LIDAR) system, a thermal imaging system, an ultrasound system, a stereoscopic system, and an optical system.

18. A previsualization system for use in generating a video signal during a previsualization of a scene comprising:
   a camera system comprising:
      a processor;
      a camera image sensor configured to generate a raw video signal comprising one or more images representative of an environment;

a camera environmental sensor configured to generate a first set of environmental data characterizing the environment;
a camera display; and
a previsualization device comprising:
a device environmental sensor configured to generate a second set of environmental data characterizing the environment; and
wherein the processor generates a three-dimensional (3D) model of the environment based on the first and second set of environmental data with a computer-generated imagery (CGI) asset at a given location therein, and
wherein the camera display displays an augmented video signal, the augmented video signal comprising the raw video signal and the CGI asset and being generated based on the given location of the CGI asset in the 3D model of the environment, and camera image sensor tracking data characterizing movements of the camera image sensor.

19. The previsualization system according to claim 18, further comprising a motion capture system configured to generate animation data characterizing a human motion, wherein the processor animates the CGI asset based on the animation data.

20. The previsualization system according to claim 18, further comprising a remote monitor configured to display the augmented video signal.

21. The previsualization system according to claim 18, wherein the raw video signal is a first raw video signal, the augmented video signal is a first augmented video signal, the 3D model is a first 3D model, and the previsualization device further comprises:
a device processor;
a device image sensor configured to generate a second raw video signal comprising one or more images at a different perspective than the camera image sensor of the environment; and
a device display, and
wherein the device processor generates a second 3D model of the environment based on the first and second set of environmental data with the CGI asset at a position and orientation within the second 3D model,
wherein the device display displays a second augmented video signal comprising the second raw video signal and the CGI asset based on the position and orientation of the CGI asset in the second 3D model of the environment.

22. The previsualization system according to claim 18, wherein the camera environmental sensor is of a first type and the device environmental sensor is of a second type different from the first type, wherein the first and second environmental sensors is one of an infrared system, a light detection and ranging (LIDAR) system, a thermal imaging system, an ultrasound system, a stereoscopic system, and an optical system.

23. The previsualization system according to claim 18, further comprising a server configured to provide the first and second set of environment data to each of the previsualization device and camera system.

* * * * *